United States Patent

Niezur et al.

(10) Patent No.: US 7,641,264 B2
(45) Date of Patent: Jan. 5, 2010

(54) REINFORCEMENT DEVICE

(75) Inventors: Michael C. Niezur, Madison Heights, MI (US); Taylor S. Robertson, Metamora, MI (US)

(73) Assignee: Sika Technology, AG, Baar (CH)

( * ) Notice: Subject to any disclaimer, the term of this patent is extended or adjusted under 35 U.S.C. 154(b) by 0 days.

(21) Appl. No.: 11/867,982

(22) Filed: Oct. 5, 2007

(65) Prior Publication Data

US 2009/0091157 A1   Apr. 9, 2009

(51) Int. Cl.
    *B60J 7/00* (2006.01)
(52) U.S. Cl. .................................. 296/187.02
(58) Field of Classification Search ............ 296/187.02, 296/204, 209, 187.03, 187.12, 146.6, 205, 296/30, 203.03; 293/109
    See application file for complete search history.

(56) References Cited

U.S. PATENT DOCUMENTS

| | | | |
|---|---|---|---|
| 5,137,770 A | 8/1992 | Rothe et al. | |
| 5,506,025 A | 4/1996 | Otto et al. | |
| 5,575,526 A | 11/1996 | Wycech | |
| 5,678,826 A | 10/1997 | Miller | |
| 5,725,272 A | 3/1998 | Jones | |
| 5,755,486 A | 5/1998 | Wycech | |
| 5,806,915 A | 9/1998 | Takabatake et al. | |
| 5,884,960 A | 3/1999 | Wycech | |
| 5,888,600 A * | 3/1999 | Wycech ..................... | 428/35.9 |
| 5,904,024 A | 5/1999 | Miwa et al. | |
| 5,919,324 A | 7/1999 | Moffitt et al. | |
| 5,936,818 A | 8/1999 | Maue et al. | |
| 5,992,923 A | 11/1999 | Wycech | |
| 6,079,180 A | 6/2000 | Wycech | |
| 6,082,864 A | 7/2000 | Rodriguez, Jr. et al. | |
| 6,092,864 A * | 7/2000 | Wycech et al. ......... | 296/187.02 |
| 6,096,403 A | 8/2000 | Wycech | |
| 6,106,303 A | 8/2000 | Wojewnik | |
| 6,112,848 A | 9/2000 | Ang et al. | |
| 6,131,897 A | 10/2000 | Barz et al. | |
| 6,165,588 A * | 12/2000 | Wycech .................. | 296/187.02 |
| 6,168,226 B1 | 1/2001 | Wycech | |
| 6,199,940 B1 * | 3/2001 | Hopton et al. ......... | 296/187.02 |
| 6,238,157 B1 | 5/2001 | Davis, Jr. et al. | |
| 6,247,287 B1 * | 6/2001 | Takabatake ............ | 296/187.02 |
| 6,253,524 B1 | 7/2001 | Hopton et al. | |
| 6,268,031 B1 | 7/2001 | Bleibler et al. | |
| 6,270,600 B1 | 8/2001 | Wycech | |
| 6,276,105 B1 | 8/2001 | Wycech | |
| 6,279,425 B1 | 8/2001 | Cicotte | |
| 6,287,666 B1 | 9/2001 | Wycech | |
| 6,296,298 B1 | 10/2001 | Barz | |
| 6,305,136 B1 | 10/2001 | Hopton et al. | |
| 6,311,452 B1 | 11/2001 | Barz et al. | |
| 6,332,731 B1 * | 12/2001 | Wycech ....................... | 296/30 |
| 6,357,819 B1 * | 3/2002 | Yoshino ................. | 296/187.02 |
| 6,368,438 B1 | 4/2002 | Chang et al. | |
| D457,120 S | 5/2002 | Broccardo et al. | |
| 6,382,635 B1 * | 5/2002 | Fitzgerald ..................... | 428/63 |
| 6,387,470 B1 | 5/2002 | Chang et al. | |
| 6,406,078 B1 | 6/2002 | Wycech | |

(Continued)

*Primary Examiner*—Kiran B. Patel
(74) *Attorney, Agent, or Firm*—Rader, Fishman & Grauer, PLLC

(57) ABSTRACT

Reinforcement components for structural members are disclosed. The reinforcement components have expansible reinforcement material that adheres to and reinforces structural members following activation. Methods of reinforcing are disclosed. Reinforced structural members are described.

6 Claims, 6 Drawing Sheets

U.S. PATENT DOCUMENTS

| | | |
|---|---|---|
| 6,413,611 B1 | 7/2002 | Roberts et al. |
| 6,419,305 B1 * | 7/2002 | Larsen .................. 296/187.02 |
| 6,455,126 B1 * | 9/2002 | Wycech ...................... 293/109 |
| 6,455,144 B1 * | 9/2002 | Wycech ...................... 296/205 |
| 6,467,834 B1 | 10/2002 | Barz et al. |
| 6,471,285 B1 * | 10/2002 | Czaplicki et al. ....... 296/187.02 |
| 6,474,722 B2 | 11/2002 | Barz |
| 6,475,577 B1 | 11/2002 | Hopton et al. |
| 6,482,496 B1 | 11/2002 | Wycech |
| 6,494,525 B1 * | 12/2002 | Blank .................... 296/187.02 |
| 6,523,884 B2 | 2/2003 | Czaplicki et al. |
| 6,546,693 B2 | 4/2003 | Wycech |
| 6,547,317 B1 * | 4/2003 | Cheron et al. .......... 296/193.01 |
| 6,550,847 B2 * | 4/2003 | Honda et al. .............. 296/146.6 |
| 6,575,526 B2 * | 6/2003 | Czaplicki et al. ....... 296/187.02 |
| 6,593,219 B2 | 7/2003 | Matsumoto et al. |
| 6,607,238 B2 | 8/2003 | Barz |
| 6,619,727 B1 | 9/2003 | Barz et al. |
| 6,634,698 B2 | 10/2003 | Kleino |
| 6,649,243 B2 | 11/2003 | Roberts et al. |
| 6,691,468 B2 | 2/2004 | Helferty |
| 6,729,425 B2 | 5/2004 | Schneider et al. |
| 6,777,049 B2 | 8/2004 | Sheldon et al. |
| 6,779,835 B2 | 8/2004 | Fox et al. |
| 6,786,533 B2 * | 9/2004 | Bock et al. ............. 296/187.02 |
| 6,793,274 B2 * | 9/2004 | Riley et al. ............ 296/187.03 |
| 6,820,923 B1 | 11/2004 | Bock |
| 6,863,957 B2 * | 3/2005 | Wycech ...................... 428/174 |
| 6,865,811 B2 * | 3/2005 | Wycech ...................... 29/897.2 |
| 6,880,657 B2 | 4/2005 | Schneider et al. |
| 6,905,745 B2 | 6/2005 | Sheldon et al. |
| 6,920,693 B2 | 7/2005 | Hankins et al. |
| 6,921,130 B2 | 7/2005 | Barz et al. |
| 6,926,784 B2 | 8/2005 | Bock |
| 6,935,861 B2 | 8/2005 | Lauciello |
| 6,938,847 B1 | 9/2005 | Yeh et al. |
| 6,941,719 B2 * | 9/2005 | Busseuil et al. ........ 296/187.02 |
| 6,969,551 B2 | 11/2005 | Richardson et al. |
| 7,004,536 B2 | 2/2006 | Wieber |
| 7,010,885 B2 | 3/2006 | Helferty |
| 7,025,409 B2 * | 4/2006 | Riley et al. ............ 296/187.03 |
| 7,105,112 B2 | 9/2006 | Czaplicki et al. |
| 7,111,899 B2 | 9/2006 | Gray |
| 7,140,668 B2 | 11/2006 | Wesch et al. |
| 7,141,194 B1 | 11/2006 | Beckmann et al. |
| 7,144,071 B2 | 12/2006 | Le Gall et al. |
| 7,160,491 B2 * | 1/2007 | Barz et al. ................. 264/46.6 |
| 7,255,388 B2 | 8/2007 | Le Gall et al. |
| 7,290,828 B2 * | 11/2007 | Kosal et al. ............ 296/187.02 |
| 7,296,847 B2 * | 11/2007 | Czaplicki et al. ....... 296/187.02 |
| 7,318,873 B2 * | 1/2008 | Czaplicki et al. ....... 296/187.02 |
| 7,374,219 B2 | 5/2008 | Brennecke |
| 2002/0053179 A1 * | 5/2002 | Wycech ...................... 52/721.4 |
| 2003/0184121 A1 * | 10/2003 | Czaplicki et al. ....... 296/187.02 |
| 2006/0000186 A1 | 1/2006 | Carlson et al. |
| 2006/0006695 A1 | 1/2006 | Lutz et al. |
| 2006/0008615 A1 | 1/2006 | Muteau et al. |
| 2006/0065483 A1 | 3/2006 | Thomas |
| 2006/0272884 A1 | 12/2006 | Vilcek et al. |
| 2007/0042066 A1 | 2/2007 | Nitsche et al. |
| 2007/0045866 A1 | 3/2007 | Gray et al. |

* cited by examiner

REINFORCEMENT DEVICE

FIELD

The present disclosure relates to devices used to reinforce mechanical structures.

BACKGROUND

Mechanical structures are present in automobiles, household appliances, flooring, machine shells, washer/dryers, airplanes, boats, or various tools. Many mechanical structures contain cavities. It is desirable to reinforce portions of the structural members surrounding such cavities. Such reinforcement can provide impact energy absorption in crash situations. Such reinforcement can also mitigate vibration and resultant noise. It is desirable to absorb impact energy and/or minimize vibration using reinforcement components that add as little weight as possible to the overall mechanical structure.

It is also desirable to have reinforcement components that are easily integrated into the manufacturing process. For example, in the case of an automobile, a reinforcement component that can readily be maneuvered into a cavity during assembly is desired.

Certain structural members contain more than one cavity, which may be adjoining. For such structural members, it is desirable to have a single component that can be placed into more than one of the cavities of the structural member during assembly. This can reduce the overall number of components used for reinforcement and therefore reduce the total weight of the components used for reinforcement.

It is also desirable that reinforcement components have at least one surface with expansible material thereon. After the reinforcement component is placed into the structural member and the structural member undergoes sufficient exposure to heat (such as during a paint bake process), the expansible material expands, cures and adheres to the structural member, thereby reinforcing the structural member.

BRIEF DESCRIPTION OF THE DRAWINGS

The foregoing brief description will be understood more completely from the following detailed description of the exemplary drawings, in which.

DETAILED DESCRIPTION OF THE DRAWINGS

The figures disclosed and described herein are illustrative examples of the appended claims, and are not intended to be limiting.

Figure 1:
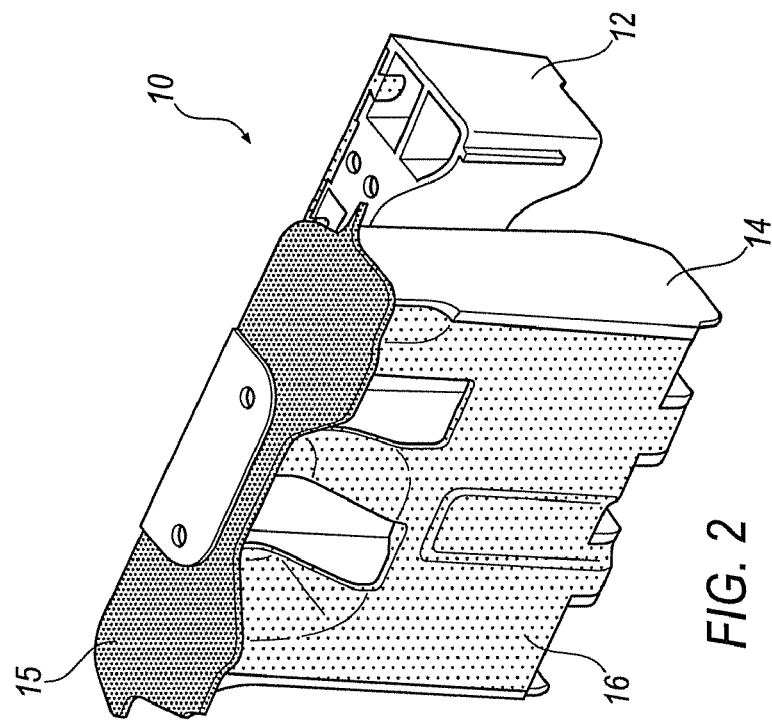
FIG. 1 is a perspective view of a reinforcement component.
Figure 2:
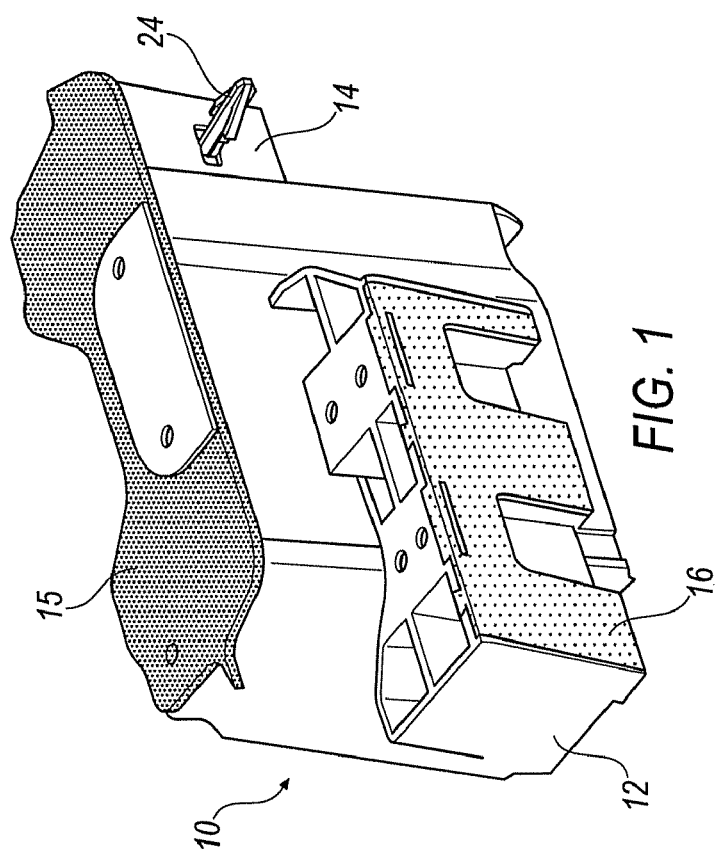
FIG. 2 is an alternative perspective view of the reinforcement component of FIG. 1.

FIGS. 1-2 provide alternative views of a reinforcement component 10 that can be used to reinforce structural members having more than one cavity. Such structural members are found in mechanical bodies such as automobiles, household appliances, flooring, machine shells, washer/dryers, airplanes, boats, or various tools.

The reinforcement component 10 has a first portion 12 and a second portion 14. The first portion 12 and the second portion 14 can comprise any material, including metal materials and plastic materials such as nylon and/or other light weight plastic materials, and combinations thereof. First portion 12 and second portion 14 can be integrally formed by any method. By way of non-limiting examples, the integral formation can be achieved by injection molding or by extrusion. Other manufacturing processes may also be suitable. The first portion 12 and the second portion 14 may also be separately formed and later joined together or connected using any method.

FIGS. 1-2 depict an expansible reinforcement material 16 disposed on both a surface of the first portion 12 and on a surface of the second portion 14. Alternatively, expansible reinforcement material 16 may be disposed on a surface of only the first portion 12 or the second portion 14. Any expansible reinforcement material may be used. For example, epoxy resin-based materials are suitable. Expansible materials may include thermosetting and thermoplastic polymers, rubbers such as SBS block-copolymers, tackifiers, curing agents, chemical and/or physical blowing agents, rheology agents, fillers, pigments, and other ingredients. The Sika Corporation sells thermally expansible reinforcer materials under the trade name SIKAREINFORCER that are suitable for use with the reinforcement component 10. A series of these thermally expansible reinforcer materials, owned by the Sika Corporation, are described in the U.S. Pat. No. 6,387,470, incorporated herein by reference in its entirety. Other suitable expansible materials are disclosed in U.S. Published Patent Application No. 2007/0110951, incorporated herein by reference in its entirety.

Any process may be used to dispose the expansible reinforcement material 16 on a surface of the first portion 12 and on a surface of the second portion 14. Such processes include but are not limited to overmolding and/or adhering or otherwise affixing strips or other shapes of the expansible material 16 on a surface of the first portion 12 and/or on a surface of the second portion 14.

Optionally, an expansible baffle material 15 may be used with the reinforcement component 10. In FIGS. 1-2, the baffle material 15 is depicted atop the second portion 14, though it is contemplated that the baffle material 15 could be located anywhere on the reinforcement component 10. Any known baffle material may be used that is capable of expanding and substantially sealing off a cavity to reduce the ability of noise to carry through the cavity. Such baffle materials may include epoxy resin, thermosetting and thermoplastic polymers (including but not limited to ethylene vinyl acetate), tackifiers, curing agents, chemical and/or physical blowing agents, rheology agents, fillers, pigments, and other ingredients. The Sika Corporation sells suitable thermally expansible baffling materials under the SIKABAFFLE trade name, which are described in U.S. Pat. Nos. 5,266,133 and 5,373,027, both of which are incorporated herein by reference in their entireties.

Any process may be used to dispose the baffle material 15 on a surface of the reinforcement component 10. Such processes include but are not limited to overmolding and/or adhering or otherwise affixing strips or other shapes of baffle material 15 on a surface of the reinforcement component 10.

Such processes also include the use of mechanical fasteners such as clips, pins, bolts or other suitable fasteners.

Figure 3:
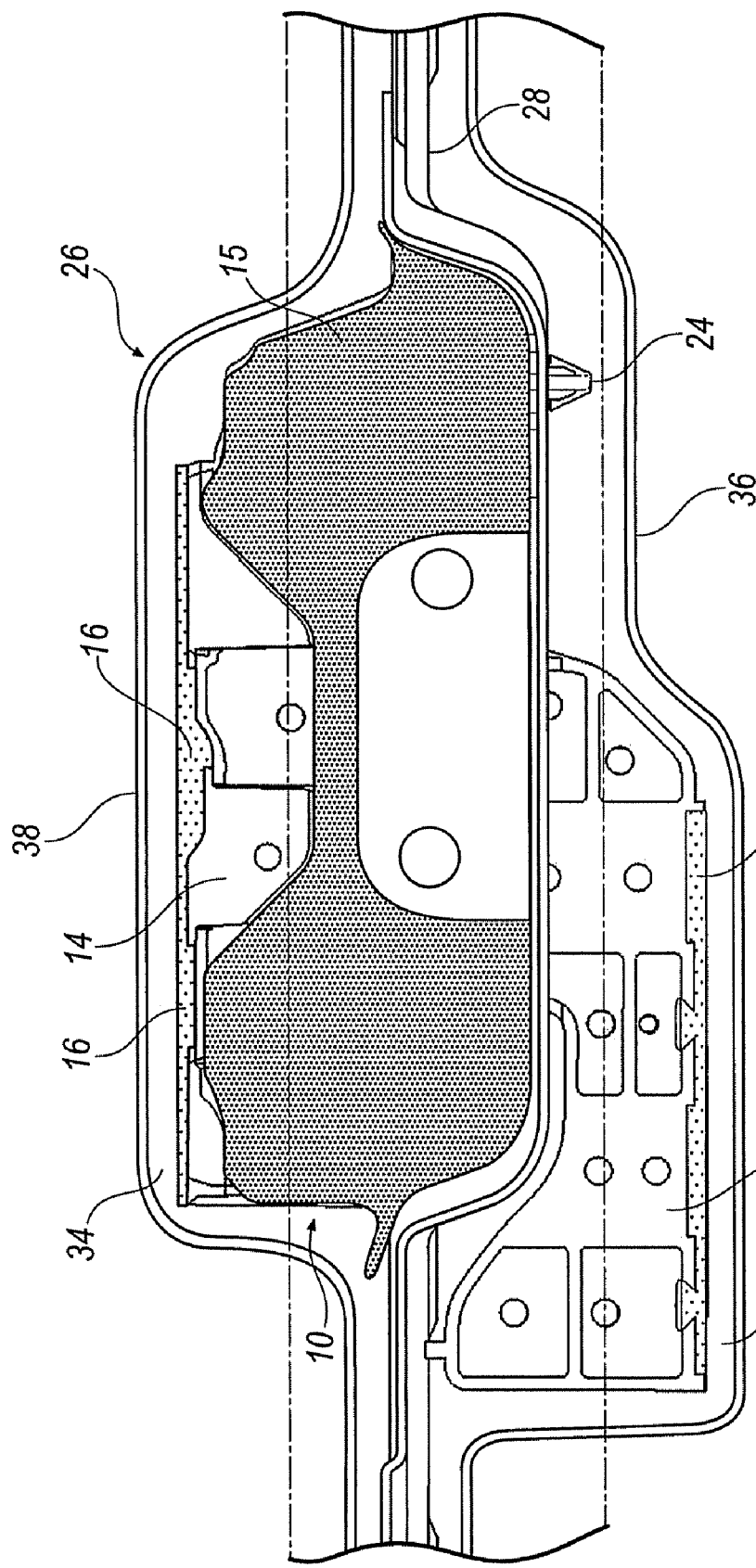
FIG. 3 is a top view of the reinforcement component of FIG. 1 secured in a structural member.

FIG. 3 depicts a B-pillar having more than one cavity. However, it is contemplated that any structural member having multiple cavities, including adjoining cavities, could be reinforced by the reinforcement component 10. In FIG. 3, structural member 26 has a first cavity 32 with a first longitudinal axis and a second cavity 34 with a second longitudinal axis. The first and second longitudinal axes are substantially parallel. It is contemplated that longitudinal axes could be exactly parallel, substantially parallel, or in another physical arrangement. The first cavity 32 is defined in part by a first wall 36 of the first cavity 32. The second cavity 34 is defined in part by a second wall 38 of the second cavity 34. The first and second cavities 32 and 34 are separated by a barrier 28. The barrier 28 has an opening 30, as depicted in FIG. 6, joining the first and the second cavities 32 and 34.

The first portion 12 can have any size and shape that is adapted to fit at least partially in a first cavity 32 of a structural member 26. The second portion 14 can have any size and shape that is adapted to fit at least partially in a second cavity 34 of the structural member 26. Although FIGS. 1-4 show only first and second portions, it is contemplated that a reinforcement component 10 could be designed and fabricated to include additional portions adapted to fit into additional cavities of a structural member.

Figure 4:
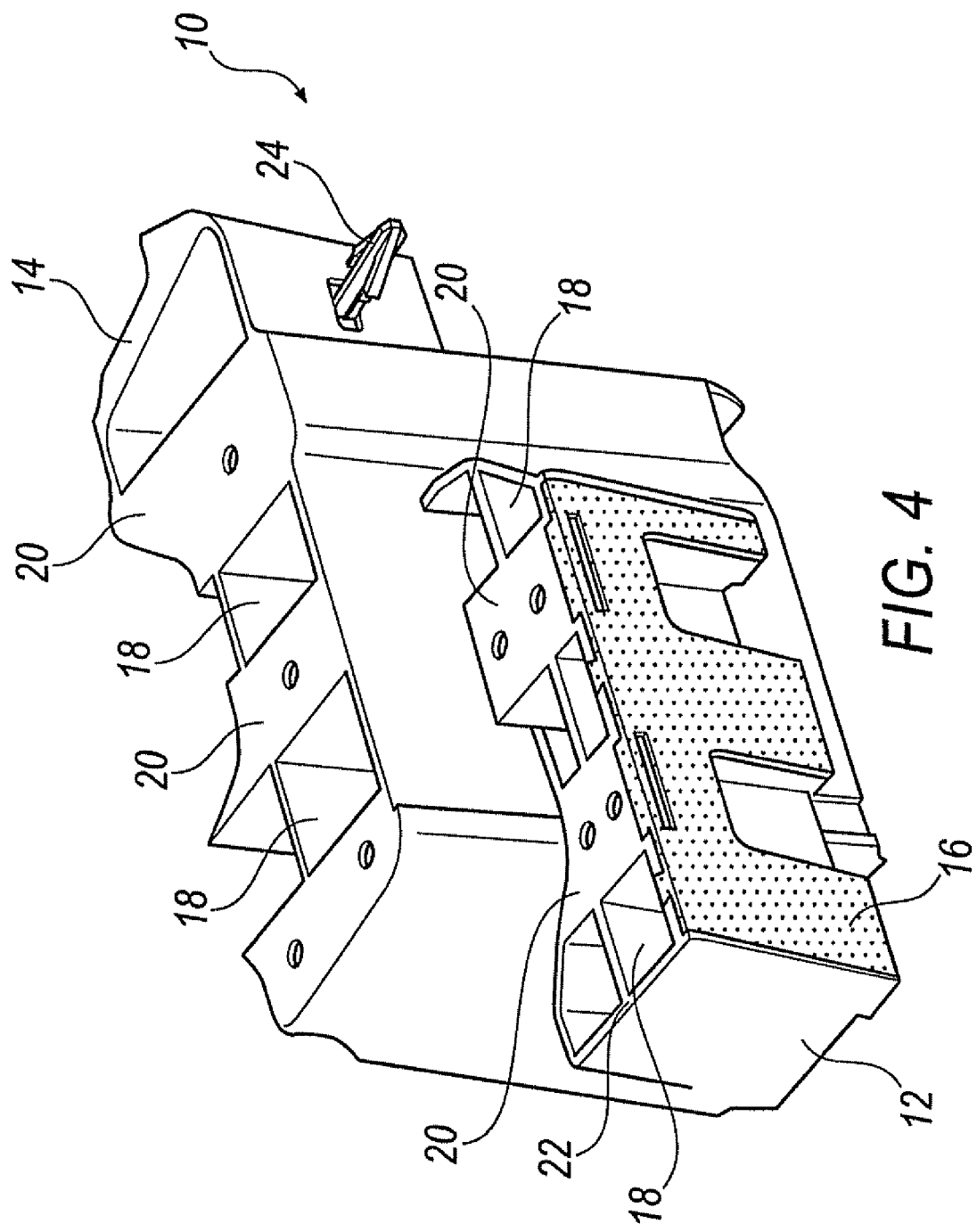
FIG. 4 is a perspective view of the reinforcement component of FIG. 1 without a layer of baffle material disposed thereupon.

In FIG. 4, the first portion 12 and the second portion 14 are cellular, having upright hollow volumes 18 alternating between inverted hollow volumes 20. Support walls 22 may optionally divide hollow volumes 18 and 20. Hollow volumes 18 and 20 are shown to be open on a first end and substantially closed on a second end opposite the first end, but other constructions are suitable. For example, the hollow volumes may be closed or substantially closed on the first end and the second end. Additionally, it is not critical to alternate between upright hollow volumes 18 and inverted hollow volumes 20. Designs with hollow volumes all being oriented upright or all being oriented inverted are contemplated, as are other arrangements. It is also not critical that the volumes be entirely hollow. The volumes may contain various ribs, protrusions and other structural features. The inclusion of a substantially hollow structure is merely one way to form a light weight reinforcement component 10.

Figure 5:
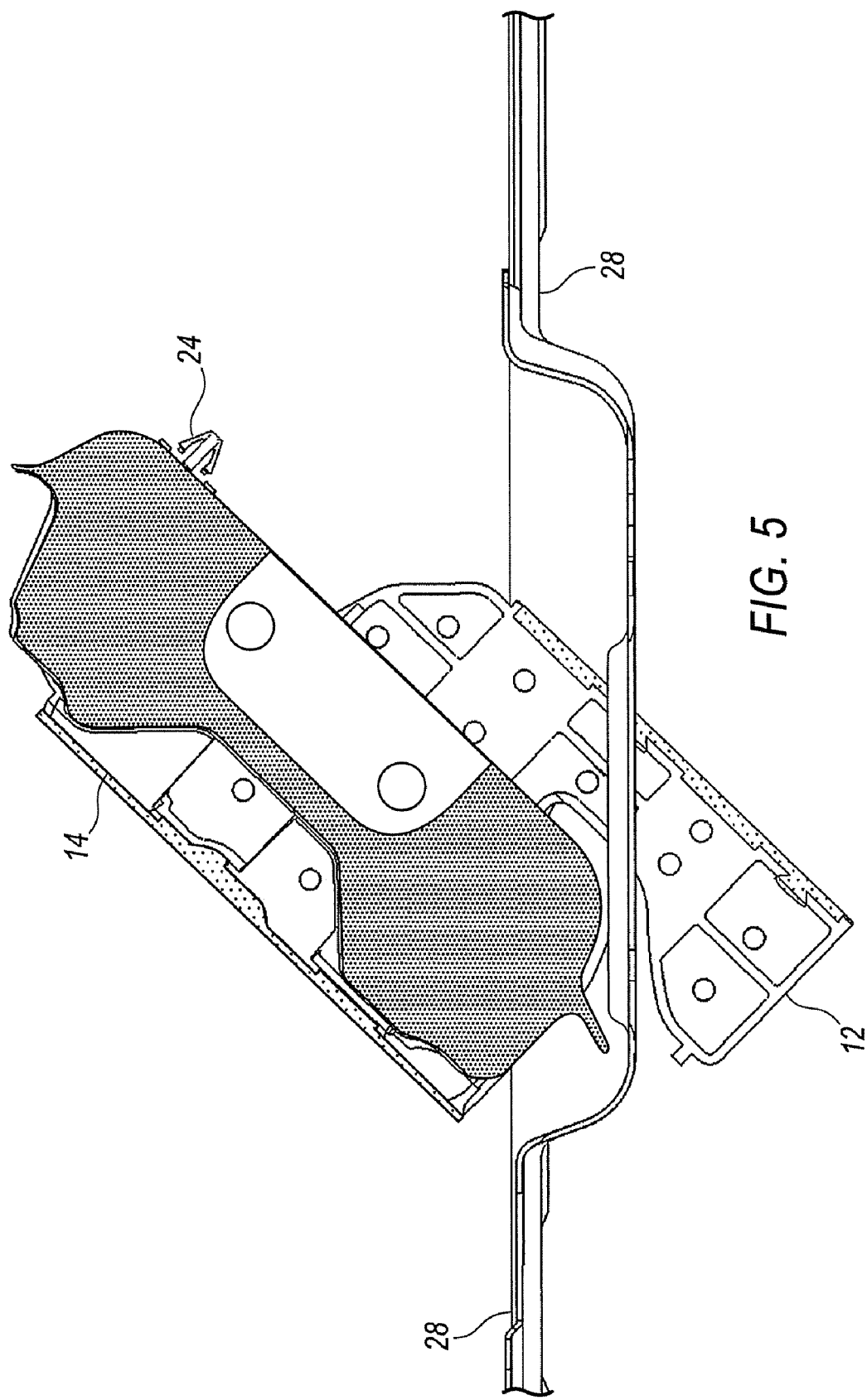
FIG. 5 is a top view of the reinforcement component of FIG. 1 in the process of being maneuvered into position in a structural member.
Figure 6:
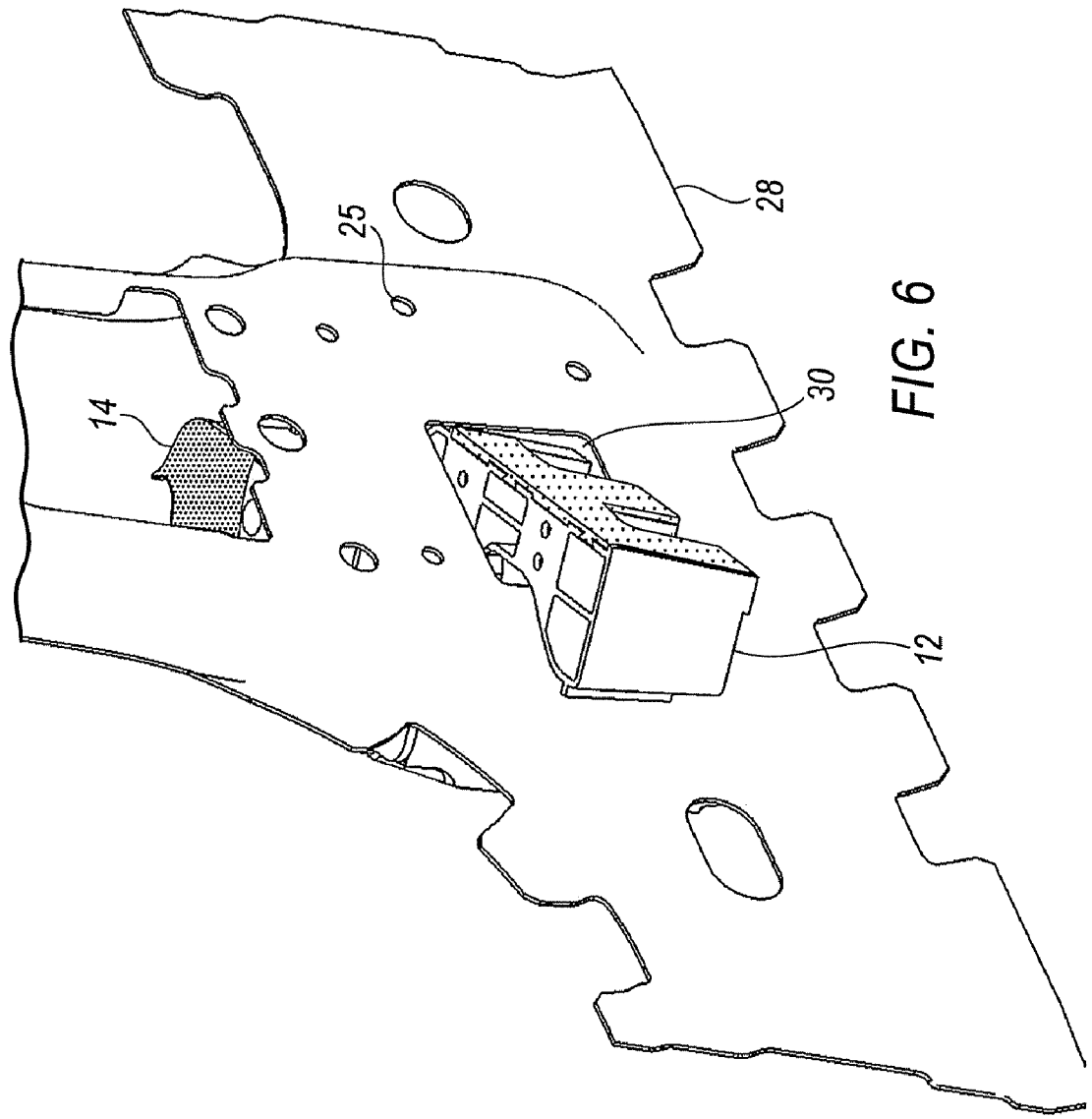
FIG. 6 is a perspective view of the reinforcement component of FIG. 1 in the process of being maneuvered into position in a structural member.
Figure 7:
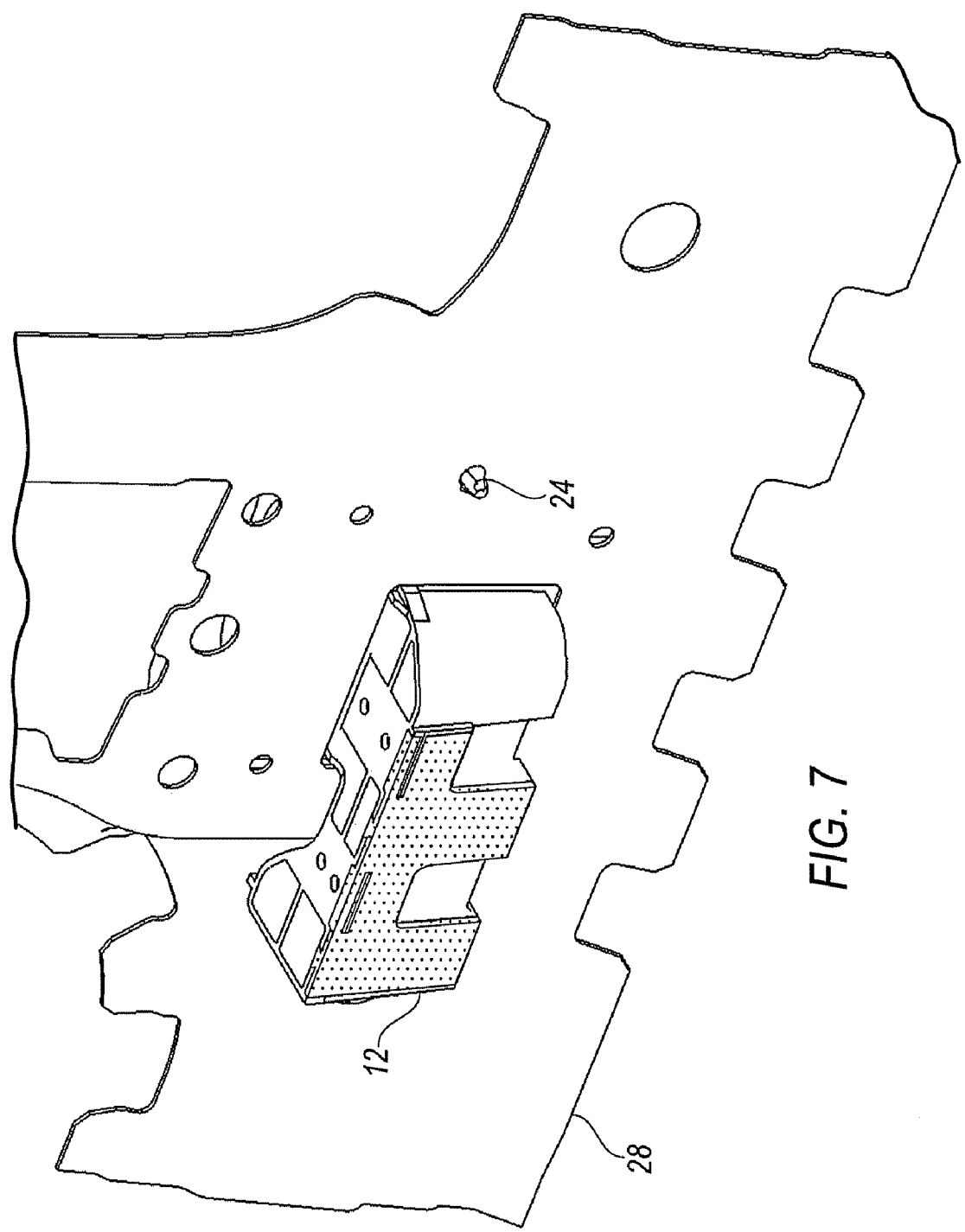
FIG. 7 is a perspective view of the reinforcement component of FIG. 1 secured in a structural member.

In FIGS. 5-7, the reinforcement component 10 is depicted as being maneuvered through the barrier 28 of the structural member 26. The first portion 12 is sized and shaped to fit through the opening 30. As depicted in FIGS. 5 and 6, the first portion 12 can be maneuvered through the opening 30 to enter the first cavity 32 by pivoting the first portion 12 about an edge of the opening 30 of the barrier 28. During maneuvering, force may be applied against the second portion 14 such that a prong 24 on the reinforcement component 10 passes through a bore 25 in the barrier 28 and becomes engaged with the barrier 28, as depicted in FIG. 7. The use of a prong is merely exemplary and any securing fastener may be used such as screw, bolt, clamp, clip, or other mechanical brace. The mechanical engagement of the prong 24 to the barrier 28 secures the reinforcement component 10 within the cavities 32 and 34 of the structural member 26. Depending on the shape of the reinforcement component 10, the nature of the opening 30, and the cavities being reinforced, the maneuvering process may invoke a number of different motions including gyratory, rotary, and revolving, as well as sliding, pushing, twisting, and jostling.

After maneuvering and upon securing of the reinforcement component 10, the first portion 12 occupies at least a portion of the first cavity 32. The second portion 14 occupies at least a portion of the second cavity 34. The first portion 12 and the second portion 14 are connected at a region that fits through the opening. The opening 30 is substantially closed when the reinforcement component 10 is secured in the barrier 28. Thus, when the reinforcement component 10 is secured, first cavity 32 and second cavity 34 are substantially or entirely separated, as shown in FIG. 3.

Methods of Reinforcing Structural Members

The reinforcement component 10 can be used to reinforce structural members found in mechanical bodies. By way of non-limiting example, when an automobile is being assembled, a reinforcement component 10 can be positioned into a cavity of a structural member such as an A-pillar, a B-pillar, a front rail, a rear rail, a rocker, a roof rail, or any structural member having at least two cavities.

After the reinforcement component 10 is placed into a structural member 26 of an automobile, the automobile is exposed to heat, such as during the paint-bake process. The heat causes the expansible reinforcement material 16 to undergo internal cross linking and to expand, cure and adhere to at least one of a plurality of walls surrounding the cavity in the structural member.

The expansible reinforcement material 16 expands to at least about 50% beyond an initial thickness. The expansible reinforcement material may expand to at least about 75%, at least about 100%, at least about 150%, or at least about 200%.

The expanded expansible reinforcement material may have a compressive strength of at least about 1000 psi, at least about 1200 psi, or at least about 1400 psi. The expanded expansible reinforcement material is adhered to both (1) a surface of the first or second portions of upon which the expansible reinforcement material was initially disposed, and (2) at least one wall defining a cavity of the structural member 26. Thus, the expanded expansible reinforcement material 16 joins the reinforcement component 10 with the structural member 26 and reinforces the structural member 26. The areas of the structural member 26 at or near the reinforcement component 10 are reinforced. As such the reinforced areas can be less susceptible to undesirable noise and vibration, and/or can absorb a greater amount of kinetic energy during a crash situation. The extent of the reinforcement depends at least in part on the compressive strength of the expanded expansible reinforcement material.

In embodiments where reinforcement component 10 also includes a baffle material, the baffle material would also expand during exposure to heat such as in a paint bake process to substantially seal off a cavity to prevent undesirable noise from traveling through the cavity. The baffle material may also adhere to the walls of the cavity. The baffle material may expand at least about 100% beyond an initially applied thickness. The baffle material may also expand at least about 260%, at least about 500%, at least about 1500%, or at least about 2000%.

The appended claims have been particularly shown and described with reference to the foregoing embodiments, which are merely illustrative of the best modes for carrying out the invention defined by the appended claims. It should be understood by those skilled in the art that various alternatives to the embodiments described herein may be employed in practicing the invention defined by the appended claims without departing from the spirit and scope of the invention as defined in claims. The embodiments should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

With regard to the processes, methods, heuristics, etc. described herein, it should be understood that although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes described herein are provided for illustrating certain embodiments and should in no way be construed to limit the appended claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A reinforcement system, comprising:
   a structural member having a first cavity with a longitudinal axis, a second cavity with a second longitudinal axis, the first and second longitudinal axes being substantially parallel and the first and the second cavities being separated by a barrier with an opening therein, the opening joining the first and the second cavities;
   a reinforcement component being insertable into the structural member through the opening, the reinforcement component having:
      a first portion shaped to fit in the first cavity having a longitudinal axis;
      a second portion shaped to fit in the second cavity, such that the second portion has a longitudinal axis that is substantially parallel to the longitudinal axis of the first portion;
   wherein, the first portion and the second portion are connected at a region that is insertable through the opening such that the first cavity and the second cavity become substantially separate and the opening becomes substantially closed upon insertion of the reinforcement component;
   wherein, expansible reinforcement material is disposed on a section of at least one of the first portion or the second portion; and
   wherein, upon exposure to heat, expansible reinforcement material is adherable to the structural member in at least the first cavity or the second cavity.

2. The reinforcement system of claim 1, wherein the first portion and the second portion are integrally formed.

3. The reinforcement system of claim 1, wherein expansible reinforcement material is disposed on a section of the first portion and a section of the second portion, wherein upon exposure to heat, expansible reinforcement material is adherable to the structural member in the first cavity and expansible reinforcement material is adherable to the structural member in the second cavity.

4. The reinforcement system of claim 1, wherein expansible reinforcement material is disposed on a section of the first portion, and wherein upon exposure to heat, expansible reinforcement material is adherable to the structural member in the first cavity.

5. The reinforcement system of claim 1, wherein expansible reinforcement material is disposed on a section of the second portion, and wherein upon exposure to heat, expansible reinforcement material is adherable to the structural member in the second cavity.

6. The reinforcement system of claim 1, wherein an expansible baffle material is disposed on a top area of at least one of the first portion or the second portion.

* * * * *